United States Patent [19]

McKinniss

[11] 4,191,070

[45] Mar. 4, 1980

[54] PLANETARY TRANSMISSION WITH PLURAL POWER PATHS

[76] Inventor: Chester L. McKinniss, 117 S. Figuroa, Santa Ana, Calif. 92703

[21] Appl. No.: 892,143

[22] Filed: Mar. 31, 1978

[51] Int. Cl.$^2$ .................... F16H 37/06; F16H 57/10
[52] U.S. Cl. ........................ 74/682; 74/675; 74/793
[58] Field of Search ............... 74/793, 682, 686, 675, 74/681, 782, 783

[56] References Cited

U.S. PATENT DOCUMENTS

| | | | |
|---|---|---|---|
| 934,716 | 9/1909 | Dodd | 74/682 |
| 2,376,429 | 5/1945 | Harry | 74/681 |
| 2,390,626 | 12/1945 | Szekely | 74/782 X |
| 2,517,879 | 8/1950 | Howard | 74/686 |
| 2,969,696 | 1/1961 | Fraga | 74/675 X |
| 2,972,905 | 2/1961 | Bullard | 74/686 X |
| 3,318,172 | 5/1967 | Cummins | 74/682 |
| 3,861,484 | 1/1975 | Joslin | 74/675 X |

FOREIGN PATENT DOCUMENTS 1162937  9/1958  France .................... 74/682

*Primary Examiner*—Lance Chandler
*Attorney, Agent, or Firm*—Edward E. Roberts

[57] ABSTRACT

There is described a transmission arrangement wherein a substantially steady-state power source drives an input shaft. The output shaft is selectively driven by gear arrangements between the input and output shafts. The output shaft is driven and accelerated as a function of retardation which is supplied to the gear arrangement between the input and output shafts.

3 Claims, 3 Drawing Figures

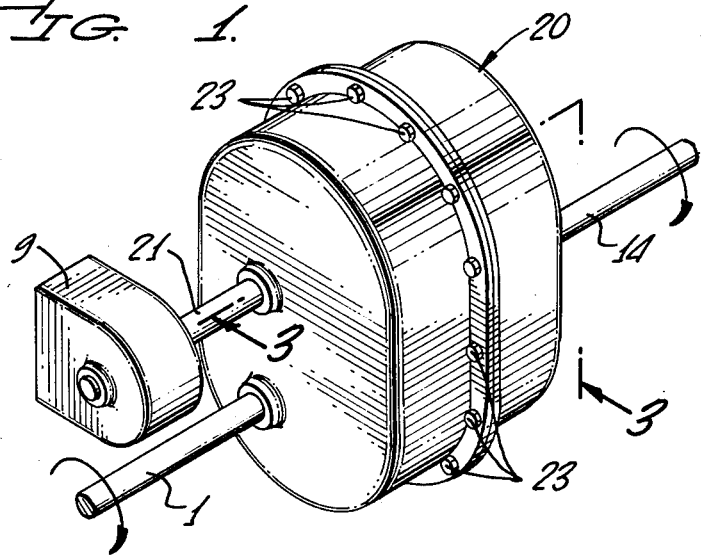

PLANETARY TRANSMISSION WITH PLURAL POWER PATHS

BACKGROUND OF THE INVENTION

1. Field of the Invention

The invention is directed to transmission mechanisms, in general, and to a transmission which provides acceleration to a driven element in response to a substantially uniform speed of an input driving unit.

2. Description of the Prior Art

There are many types of transmissions which are known in the art. However, most of the transmissions which are known require rather expensive, quite complicated gear or belt arrangements. In addition, the known transmissions typically permit acceleration of the driven unit only through acceleration of the driving source. Consequently, many types of power sources are not readily utilizable for the purposes desired. In addition, a requirement that the power source change its speed or rpm produces an inefficient arrangement.

By replacing the transmission system, many other power sources could be utilized more efficiently. For example, gas turbines or turbo machinery can be utilized. In addition, many other electric motors or power sources can be used. That is, in an electric motor, the frequency of the driving signal need not be changed. In a gas turbine system, the major problem is the acceleration lag experienced thereby. By avoiding the need for accelerating the power source, a gas turbine engine can be more readily utilized. Moreover, the gas turbine engine can be operated at its optimum speed characteristic. Thus, the efficiency thereof can be increased.

The utilization of this type of transmission which permits acceleration at the output but requires change only of power at the input has been tried in the past. However, as noted, these approaches have been extremely expensive and complicated.

PRIOR ART STATEMENT

The prior art noted herewith is the most pertinent prior art known to applicant.

U.S. Pat. No. 2,488,408, Hydraulic Variable Speed Motion Transmission Hollmann et al. This transmission requires a fluid, a rotary pump and gearing mechanisms. The speed ratios of the transmission are dependent upon the fluid flow through the pump.

U.S. Pat. No. 3,380,320, Hydraulic Supercharged Variable Transmission, Zierick. This transmission requires a fluid, a fluid impeller, a fluid clutch pump, and a pump rotor housing, as well as detailed structures and structural arrangements related to the fluid system.

U.S. Pat. No. 3,741,040, Hydrostatic-Mechanical Transmission, Shaw. This transmission requires at least two positive displacement hydraulic devices and conduit means connecting a pump for driving a hydraulic motor.

U.S. Pat. No. 3,752,013, Power Transmission having a Hydrostatic Drive combined with a Hydrodynamic Drive, Cross. This transmission requires a fluid pump, a fluid motor, pinion gears, and a hydrodynamic drive with a fluid impeller drive.

U.S. Pat. No. 3,955,435, Variable Speed Drive Mechanism, Arick. This apparatus requires a set of three interconnecting gears; one of which is fixed and eccentrically mounted with a hinged arm interconnecting the gears. The speed of the output is a function of the degree of eccentricity noted.

SUMMARY OF THE INVENTION

The invention comprises a transmission mechanism including an input shaft and an output shaft. The input and output shafts are provided separately. A suitable gearing arrangement is to selectively interconnect the input shaft to the output shaft via the gear arrangement. A retardation device is selectively applied to a portion of the gearing arrangement to cause the gear arrangement to couple the input and output shafts together.

The gearing arrangement includes a planetary and sun gear arrangement connected to the input shaft and a suitable gearing arrangement connected to the output shaft. A further planetary and sun gear arrangement is, preferably, interposed between the first mentioned planetary gear and the gear arrangement associated with the output shaft.

BRIEF DESCRIPTION OF THE DRAWINGS

FIG. 1 is a prospective view of the gear box or transmission of the instant invention.

FIG. 2 is an exploded view of the gearing arrangement of the instant invention.

DESCRIPTION OF A PREFERRED EMBODIMENT

Figure 3:
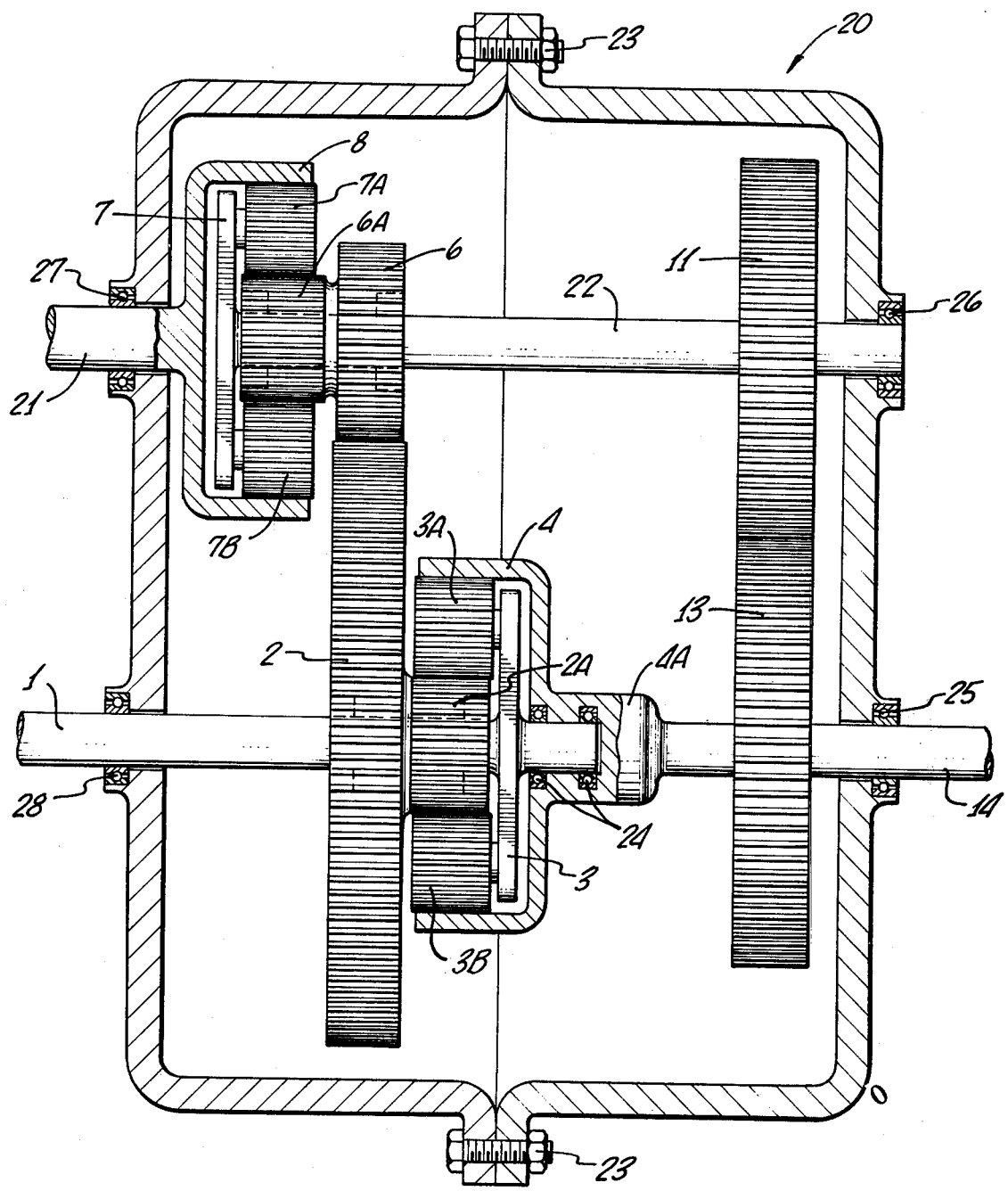
FIG. 3 is a cross sectional view of the gearing arrangement maintained in the gear box of FIG. 1 and is taken along the lines 33 of FIG. 1.

In the following description and in the drawings, similar components bear similar reference numerals.

Referring now to FIG. 1, there is shown a perspective view of the transmission mechanism discovered by the instant invention. The perspective view shows the arrangement of input shaft 1 and output shaft 14, relative to the casing or housing 20 in which the gear arrangements (discussed infra) are contained. Housing 20 typically comprises two portions which are held together by a suitable arrangement such as nuts and bolts 23 which pass through mating apertures in mounting flanges. Shaft 21 also extends from housing 20 and is associated with retarding device 9 which may be of any suitable configuration. Retarding device 9 may be electrical, mechanical, hydraulic or any combination thereof. Typically, retarding device 9 will be mounted to a support body (not shown) associated with housing 20. As shown in FIG. 1 the arrows represent rotation of shafts 14 and 1 and indicate that the shafts operate to revolve or rotate in the same direction.

Referring concurrently to FIGS. 2 and 3, it is noted that shaft 1 extends through bearing 28 in one porton of housing 20. Shaft 1 passes through a central aperture in sun gears 2 and 2A. Input shaft 1 is affixed to the spindle or spider 3 of a planetary gear. The end of shaft 1 is jounaled in bearings 24 which is mounted in the axial extension of ring gear 4. Thus, shaft 1 is rotatably mounted in housing 20 and the central aperture of ring gear 4. In addition, sun gears 2 and 2A are rotatably mounted on shaft 1. The spider of planetary gear 3 is affixed to and rotates with shaft 1. Rotatably mounted at the outer extremities of spider 3 are gears 3A and 3B which are arranged to mesh with the teeth on the inner surface of ring gear 4 and the gear teeth on the higher periphery of sun gear 2A.

The axial extension 4A of ring gear 4 is affixed to one end of output shaft 14. Output shaft 14 is further passed through another aperture in housing 20 and rotates in bearing 25 therein. Gear 13 is fastened to shaft 14 in a suitable manner for rotation therewith.

Gear 11 meshes with gear 13 and is affixed to shaft 22. Shaft 22 extends through an aperture in housing 20 and is journaled in bearing 26 for ready rotation. In addition, shaft 22 is integrally formed with the spider portion of planetary gear 7. Rotatably mounted at the outer extremities of the spider of planetary gear 7 are gears 7A and 7B, respectively. Gears 7A and 7B are arranged to mesh with the gear teeth on the inner surface of ring gear 8. Ring gear 8 is integrally formed with shaft 21 which passes through an opening in housing 20 and is rotatably mounted in bearing 27. Shaft 21, as best shown in FIG. 1, is associated with retardation device 9.

Sun gears 6 and 6A are also rotatably mounted on shaft 22. Gear 6A is arranged to mesh with gears 7A and 7B in the planetary gear. Gear 6 which is affixed to gear 6A is arranged to mesh with gear 2. Gear 11 is affixed to shaft 22 and meshes with gear 13.

While the transmission is shown substantially to scale, it is to be understood that other modifications can be made thereto and that the gear ratios as suggested in the drawings, need not be followed exactly. Other desirable gear ratios and arrangements can be provided.

In describing the operation of the gear box, it is assumed that input shaft 1 is connected to a suitable power source (not shown). This power source may be a turbine engine, a gasoline engine, a diesel engine, electric motor, or the like. In addition, a flywheel device can be applied, if desired, in order to establish a relatively constant or uniform rotational rate for input shaft 1. As shaft 1 rotates, the spider of planetary gear 3 rotates therewith. Rotation of planetary gear 3 attempts to apply a driving force to ring gear 4. However, through the application of relatively nominal load at shaft 14, ring gear 4 may be held substantially motionless. Under these circumstances, gears 3A and 3B impart a rotational drive to sun gears 2A and 2B whereby sun gear 2 is forced to turn at an accelerated rotational rate which is approximately three times the rate of the planetary gear 3.

When sun gear 2 rotates under the conditions as stated sun gear 6 is also driven. Sun gear 6 and gear 6A rotate at a speed which is a function of the gear ratio of gears 2 and 6. In a preferred embodiment, this ratio is on the order of 1:1. In addition, rotation of gears 6 and 6A tends to apply a rotational or driving force to gears 7A and 7B of planetary gear 7 as well as to ring gear 8. In a no-load condition, ring gear 8 tends to rotate along with shaft 21 inasmuch as planetary gear 7 is held substantially motionless through shaft 22 and gear 11 which meshes with gear 13 on shaft 14. Consequently ring gear 8 tends to rotate while output shaft 14 remains motionless.

If, however, the retarding device 9 is operated through any suitable mechanisms (not shown) to apply a retarding effect to shaft 21, ring gear 8 will also be retarded inasmuch as it is formed as a part of shaft 21. As a consequence, planetary gear 7 is now forced to rotate due to the rotation of gears 6 and 6A. When planetary gear 7 begins to turn or rotate, shaft 22 is rotated which drives gear 11. As gear 11 begins to rotate, it, in turn, drives gear 13 which is attached to output shaft 14. Consequently, shaft 14 begins to rotate in the direction controlled by input shaft 1.

At the time that the resistance is experienced by gear 6 due to the operation of retardation device 9, a certain load or drag is transmitted via gear 6 back to gear 2.

The load or drag at gear 2 is then transmitted via gear 2A to planetary gears 3 and, thus, to ring gear 4. Consequently, ring gear 4 also begins to rotate and drives shaft 14 along therewith. Consequently, it is seen that output shaft 14 rotates at a rate which is a function of the magnitude of the retardation or friction applied by retarding device 9. More specifically, the greater the retardation effected by retarding device 9, the faster that output shaft 14 will rotate.

In establishing this arrangement, it is noted that a suitable torque division is developed wherein approximately 70% of the torque is developed on ring gear 4 while 30% of the torque developed by the transmission is developed on sun gear 2. Moreover, the torque division acting through gears 6, 7, 8, 11 and 13 is approximately 3:1 wherein the torque at output shaft 14 should be approximately equal to the torque at input shaft 1 when device 9 is fully retarding relative to shaft 21. Furthermore, it should be noted that even though the transmission causes changes in speed at the output shaft, it does not change the torque generated thereat.

While retarding device 9 can be constructed in any number of suitable ways such as mechanical, electrical, hydraulic or any combination thereof, the details thereof are not important to this invention.

While approximate gear ratios have been described, operation in the preferred embodiment described herein is such that operation follows the following example. For example, with input shaft 1 having a speed of 3,000 rpm, gear 3 operates at that speed also. In the initial conditions noted above, gear 2 turns at approximately 9,000 rpm when the suggested gear ratio of 3:1 is established at the first planetary gear unit (i.e. gears 2, 2A, 3 and 4). Likewise, with a 1:1 gear ratio, gear 6 also rotates at 9,000 rpm. Gear 7 does not rotate wherein shaft 22 is substantially motionless. However, the planetary gear 7, especially gears 7A and 7B rotate in accordance with rotation of gear 6A. Gear 8 is driven at approximately 4,000 rpm in the reverse direction relative to gear 6. As noted, gears 11 and 13 were stationary.

Assuming that shaft 21 is retarded by retarding device 9, to a partial extent, and that shaft 1 and gear 3 continue to rotate at 3,000 rpm with partial retardation, it is assumed that gear 6 experiences drag and slows to a turning or rotating rate of 4,500 rpm. This rate i.e. 4,500 rpm, is then transferred to gear 2. Consequently, gear 7 begins to rotate at approximately 500 rpm which reflects a rotational rate of approximately 2,000 rpm at gear 8. Likewise, because of the 3:1 ratio between gears 2 and 3, planetary gear 3 begins to cause ring gear 4 to rotate at approximately 1500 rpm. It is clear that this is approximately one half of the input rotation speed which indicates the amount of drag or retardation placed on shaft 21 by retarding device 9.

If it is assumed that retarding device 9 imposes a complete stopping or braking of shaft 21 without any slippage, the speed of output shaft 14 can be controlled to be the same as the speed of the input shaft.

Of course by altering the gear ratios of the planetary gear units the speed of output shaft 14 can be controlled to be higher or lower than the rotational speed of input shaft 1.

Thus, there has been shown and described a preferred embodiment of the instant invention. While a preferred embodiment has been described and examples suggested, it is clear that other applications to this invention may be included. For example, it is possible that gears 6, 7, 8, 11 and 13 may be omitted by applying retarding device 9 directly to gear 2. However, this other arrangement is not quite as efficient as the preferred embodiment shown. In addition, the various gears can be arranged in a co-axial manner but new gear designs may be required while the gears shown in the embodiment herein are state-of-the-art components. Furthermore, retarding device 9 can be arranged to act as a governor or speed control for the transmission. These and any other modifications which are suggested to those skilled in the art and which fall within the purview of this description, are intended to be included herein as well. The scope of the invention is limited only by the claims appended hereto.

Having thus described the preferred embodiment of the invention, what is claimed is:

1. A transmission device comprising:
   input shaft means;
   output shaft means;
   first planetary gear means connected to one end of said input shaft means;
   first ring gear means connected to one end of said output shaft means;
   said first planetary gear means and said first ring gear means arranged to be in meshing engagement;
   first sun gear means rotatably mounted adjacent said one end of input shaft means and in meshing engagement with said first planetary gear means;
   retarding means for controlling the rotation of said first sun gear means in order to selectively engage said input shaft means and said output shaft means via the engagement of said first planetary gear means and said first ring gear means;
   bearing means included in said first ring gear means for supporting said one end of said input shaft means;
   intermediate shaft means;
   secondary planetary gear means connected to one end of said intermediate shaft means;
   second sun gear means rotatably mounted adjacent said one end of said intermediate shaft means, and in meshing engagement with said first sun gear means;
   first output gear means connected to said output shaft means;
   second output gear means connected to said intermediate shaft means and in meshing engagement with said first output gear means;
   second ring gear means connected to said retarding means and in meshing engagement with said second planetary gear means; and
   each of said first and second sun gear means includes first and second gear portions.

2. The transmission device recited in claim 1 wherein, said first gear portions of said first and second sun gears are in meshing engagement with the respective one of said first and second planetary gear means.

3. The transmission device recited in claim 2 wherein said second gear portions of said first and second sun gear means are in mutual meshing engagement.

* * * * *